United States Patent [19]
Kley

[11] 4,079,194
[45] Mar. 14, 1978

[54] GRAPHICAL DATA ENTRY PAD

[76] Inventor: Victor Kley, 2212 Byron St., Berkeley, Calif. 94702

[21] Appl. No.: 712,748

[22] Filed: Aug. 9, 1976

[51] Int. Cl.$^2$ ............................................. G08C 21/00
[52] U.S. Cl. ........................................................ 178/18
[58] Field of Search ............................ 178/18, 19, 20; 340/146.35 Y, 365 S, 365 C, 365 A

[56] References Cited

U.S. PATENT DOCUMENTS

| | | | |
|---|---|---|---|
| 3,591,718 | 7/1971 | Asano et al. | 178/19 |
| 3,798,370 | 3/1974 | Hurst | 178/18 |
| 3,894,183 | 7/1975 | Barish | 178/18 |
| 3,914,548 | 10/1975 | Barish | 178/18 |

Primary Examiner—Thomas A. Robinson
Attorney, Agent, or Firm—O'Brien & Marks

[57] ABSTRACT

A data entry pad for the entry of two-dimensional graphical data to a communication system includes a resistive grid area to which a conductive layer may be selectively contacted so that graphical data can be generated by external resistance measuring electronic circuitry. The resistive grid area is formed by a pattern of resistive inking on a base and is separated from the conductive layer by a foamed thermoplastic insulating separator. High resistance bands surround the grid area so as to linearize its output values.

20 Claims, 6 Drawing Figures

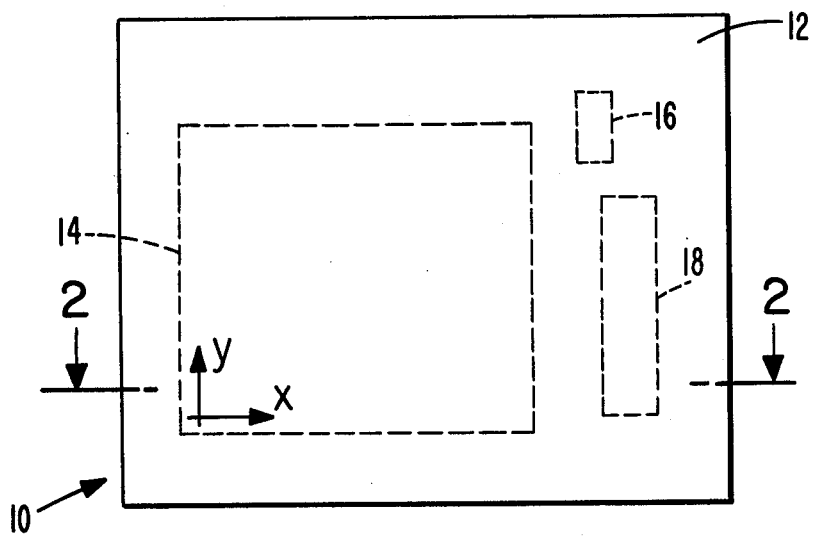
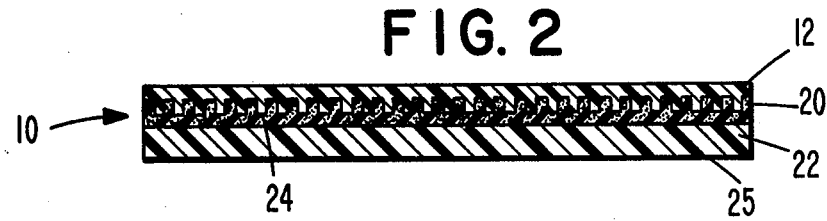
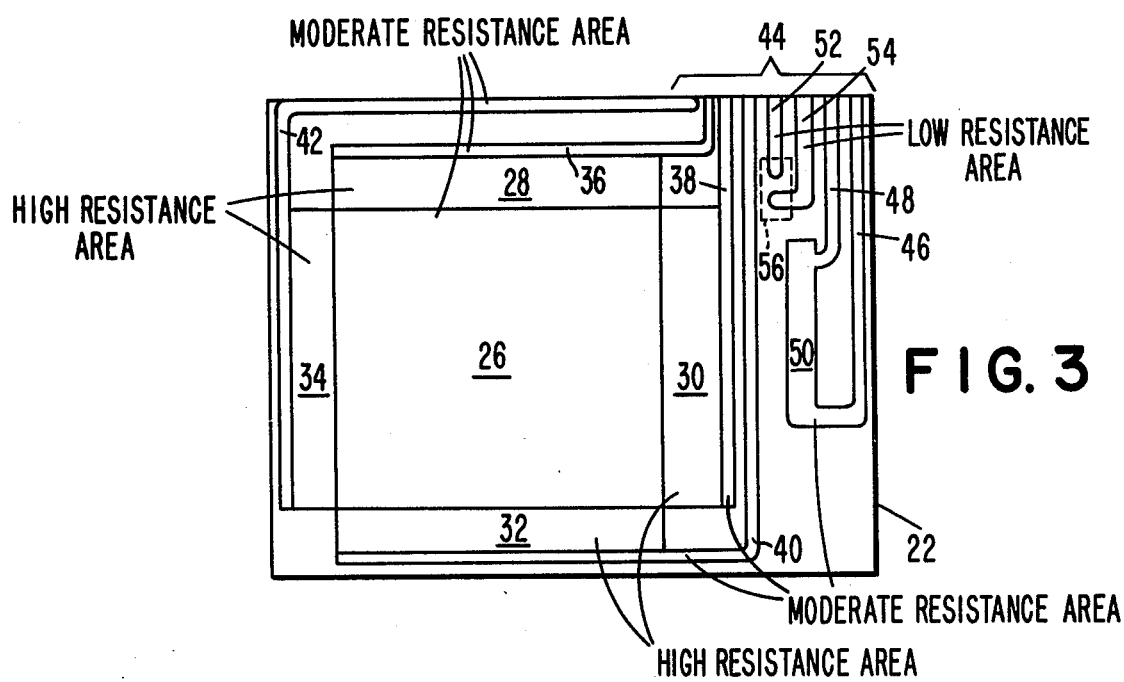

GRAPHICAL DATA ENTRY PAD

BACKGROUND OF THE INVENTION

1. Field of the Invention

The present invention relates to data entry devices for entering graphical data into data processing or communication systems and, more particularly, to pad devices for the direct entry of such data by a user.

2. Description of the Prior Art

It is well known in the prior art to construct graphical data entry devices in which a user may depress a point on a grid area to enter a point of graphical data into a communication system. Examples of such devices are shown in U.S. Pat. No. 2,900,446, No. 3,304,612, No. 3,699,439, and No. 3,806,912. Another example is disclosed in U.S. Pat. No. 3,522,663 in which a flexible member coated with a conductive layer is positioned above a base member which is coated with a resistive material so that the location of a point at which the two members are pressed together can be determined by measuring the resistances from the edges of the layer of resistive material to that point.

SUMMARY OF THE INVENTION

The invention is summarized in that a graphical input data entry device includes a planar resistive grid area with four edges, planar resistive means extending along and connected to the edges of the resistive grid area, connecting means spaced from the planar resistive means for electrically connecting the edges of the resistive grid area to external electronic circuitry, wherein the planar resistive means has an effective resistance parallel the edges of the resistive grid area substantially higher than that of the resistive grid area.

An object of the present invention is to construct a graphical data entry device using a uniformly resistive grid area and in which the output values from the grid area are linearized.

Another object of the present invention is to provide such a graphical data entry device which is economical and at the same time extremely rugged and durable.

Yet another object of the present invention is to construct such a graphical data entry device in which additional switching features can be incorporated into the device with a minimum increase in cost.

Other objects, advantages and features of the present invention will become apparent from the following description when taken in conjunction with the accompanying drawings.

BRIEF DESCRIPTION OF THE DRAWINGS

FIG. 1 is a top plan view of a graphical data entry device constructed according to the present invention.

FIG. 2 is a cross-section through the line 2—2 of FIG. 1.

FIG. 3 is a top plan view of the base pad of FIG. 1.

DESCRIPTION OF THE PREFERRED EMBODIMENT

Figure 4:
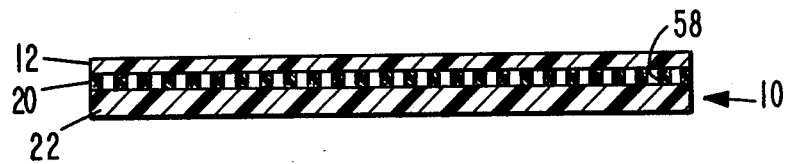
FIG. 4 is a cross-section similar to FIG. 2 of an alternative embodiment of the graphical data entry pad of the present invention.

Shown in FIG. 1 is an embodiment of a graphical data entry pad 10 constructed according to the present invention. The entry pad 10 has a flexible top cover 12 upon which suitable indicia are provided to indicate the operative portions of display pad 10, the indicia being applied by silkscreening, printing or other appropriate method to the upper surface of the top cover 12. The operative portions indicated by the indicia on the top cover 12 include a rectangular coordinate axis graphical input grid 14, a switch device 16, and a slide potentiometer 18.

As shown in the cross-sectional view of FIG. 2, the entry pad 10 includes the top cover 12, an insulating separator 20, and a base pad 22, the top cover 12 and the base pad 22 being disposed on opposite sides of, and in contact with the insulating separator 20. The top cover 12 is a flexible, resilient, planar member either formed entirely of a conductive material or formed with a surface layer of conductive material bonded to its lower surface. A large number of depending projections 24 are formed closely packed all along the lower surface of the top cover 12, the projections 24 extending so as to penetrate into the insulating separator 20. The insulating separator 20 is formed of a formed insulating thermoplastic or other resilient and flexible material of a relatively low density. The base pad 22 is formed as a relatively rigid, planar member composed of thermoplastic or other insulating material and has provided on its upper surface a patterned layer of resistive material, as will be shown. All of the top cover 12, the insulating separator 20 and the base pad 22 may be either formed of material of an opaque character, if the entry pad 10 is used for data entry alone, or of material of an optically transparent or translucent nature, if the entry pad 10 is to be mounted on a CRT or other optical display device for the purpose of providing visual feedback or reply information to the user of the pad. A layer of adhesive 25 is applied to the back surface of the base pad 22 for mounting purposes.

Details of the pattern of the resistive material on the top surface of the base pad 22 can be seen in FIG. 3. Directly in alignment beneath the input grid 14 on the top cover 12 is a large, generally rectangular grid area 26 of moderate resistance material. The grid area 26, and all of the other areas of patterned resistance on the top of the base pad 22, may be formed by a layer of any suitable resistive material, but are preferably formed by an even linear spread of a layer of resistive ink applied to the top of the base pad 22 through a mask or pattern. Provided in a position so as to adjoin each of the four edges of the grid area 26 are four high resistance buffer bands 28, 30, 32 and 34, each of which extends the full length of the adjoining edge of the grid area 26, each being of a similar constant width, and all of which together form a buffer along all the edges of the grid area 26. Located along the full length of the outside edge of each of the high resistance bands 28, 30, 32, and 34 are respective connecting strips 36, 38, 40 and 42 all of which extend from adjacent the respective high resistance band to a common contact area 44 of the base pad 22 by appropriate paths along the top surface of the base pad 22. The grid area 26 and the connecting strips 36, 38, 40 and 42 are all formed of a moderate resistance ink which has a resistance or resistivity per square that is significantly lower than that of the high resistance bands 28, 30, 32 and 34. A ratio of approximately 1:10 between the resistances of the moderate resistance areas and the high resistance areas has been found to give preferable results, as will be explained below. Also formed on the base pad 22 by a pattern of moderate resistance ink are two connecting paths 46 and 48 which extend from the contact area 44 to opposite ends of a potentiometer area 50 also formed of moderate resistance ink. A pair of switch connecting runs 52 and 54 extend from the contact area 44 to a switch area 56, the connector runs 52 and 54 being formed of either low resistance or conductive ink. The base pad 22 is positioned relative to the top cover 12 so that the grid area 26 on the base pad 22 is positioned directly underneath the input grid 14 of the top cover 12, the switch area 56 of the base pad 22 is positioned beneath the switch device 16 on the top cover 12, and the potentiometer area 50 of the base pad 22 is positioned beneath the potentiometer 18, as indicated on the top surface of the top cover 12. Appropriate external electronic measuring and transmitting circuitry is attached to both the top cover 12, and to the resistive area on the base pad 22 through the contact area 44. To seal the entry pad 10 in its completed configuration, the top cover 12 may be made slightly larger than otherwise would be necessary so that it may be brought around the sides of the entry pad 10 and heat sealed to the back of the base pad 22 to effectively seal the package.

In the operation of the data entry pad 10 of FIGS. 1–3, the user depresses a point on the pad in the input grid 14 to indicate a position of graphical data to be entered through the entry pad 10 to a remote terminal or data processing device. The depression of such a point causes the flexible top cover 12 to bend and causes one or more of the projections 24 formed on the under surface of the top cover 12 to penetrate through the insulating separator 20 to touch the base pad 22 in the area of the grid area 26. The external electronics attached to both the top cover 12 and to the contact area 44 of the base pad 22 continually scans the grid area 26 to determine the location of points so depressed. The location of each depression is determined by the electronics which independently measures the relative resistances in both the horizontal, or "x", and the vertical, or "y", axes between the point depressed, which is connected to the outside circuitry by the conductive surface of the top cover 12, and the edges of the grid area, which are connected to the external circuitry by the connecting strips 36, 38, 40 and 42. These two resistances proportional to the "x" and "y" position of the depression can be translated by analog to digital conversion to digital information for transmission to a data processing device or other interactive terminal. The remote device can either transmit the data elsewhere, store it, or return the data to a display associated with the entry pad 10 for feedback to the user. The functions associated with the switch area 16 and the potentiometer 18 are optional additions easily constructed on the entry pad 10 to provide auxiliary entry of both digital and analog data respectively, or to control the operation of the feedback display device, if one is used.

The high resistance bands, 28, 30, 32 and 34 are provided to linearize the output values obtainable from the grid area 26 of the entry pad 10. In previously known graphical input devices not including such high resistance bands, one problem has been a non-linearity in the outputs of the devices due to the non-uniform distribution of an electric field across a resistance. Thus, for example, looking at FIG. 3 and ignoring, for a second, the high resistance bands and assuming the connecting strips 36, 38, 40 and 42 are of low resistance and connected to the edges of the area 26 but not to each other, if an electric field were imposed between the connecting strips 36 and 40 to scan the "y" axis, lines of equipotentiality would be created in the grid area 26. These lines would be approximately linear in the very center of the grid area 26, but would become increasingly dislinear in a hyberbolic function toward each of the left and right edges of the grid area 26 since the left and right edges would be shunted by the connecting strips 38 and 42. Thid dislinearity could be minimized by constructing a very large resistive surface area and then only using a small area near the center for the grid area. The present invention achieves linearity by the high resistance bands 28, 30, 32 and 34 which have an effective resistance parallel to the respective edges of the grid area 26 substantially higher than the resistance of the grid area 26 to reduce shunting the edges of the grid area thereby tending to linearize the lines of equipotentiality toward both sides of the grid area 26. Experiments have shown that for a resistance of the high resistance bands 28, 30, 32 and 34 of ten times the resistance of the grid area 26, the dislinearity is reduced to about 3% for a graphics pad of average size, and can be reduced still further for miniature-size pads.

As shown in FIG. 3, the connecting strips are formed of moderate resistance material. This is done, in this embodiment, merely because it was more convenient to do so in the resistive ink process used by the applicant. The connecting strips 36, 38, 40 and 42 may be made of moderately resistive material, as shown in FIG. 3, or may also be made of either low resistance or conductive material without affecting the functioning of the entry pad 10. In addition, if additional linearity is required, the connecting strips 36, 38, 40 and 42 could be shaped to further linearize the pad. This shaping would take the form of widening the connecting strips and narrowing the high resistive bands toward the center of their common border, and tapering the connecting strips toward each end thereof.

As also can be seen in FIG. 3, the resistive ink process by which the resistance areas of this embodiment are applied to the base pad 22 is particularly advantageous in that it allows for additional optional switching features to be added to the graphics pad 10 with little or no increase in cost or complexity. The switch area 16 can be used for conveying digital information to the remote terminal, or for a local control of a display device, if one is used. Depression of the top cover 12 in the region of the switch area 16 causes several of the projections 24 of the top cover to penetrate the insulating separator 20 to touch both of the connector runs 52 and 54 of the switch area 56 on the base pad 22. This functions thereby as a simple manually closeable switch, the operation of which can be sensed by the external circuitry through the connector runs 52 and 54. Depression of the top cover 12 in the area of the potentiometer 18 similarly causes the top cover 12 to contact some part of the potentiometer area 50 so that a resistance value can be read by the external circuitry through the connecting paths 46 and 48. This resistive value can be used for conveyance of analog information to the remote data processor, or could be used as a local control for a display device, as for example, an intensity or brightness control for a CRT.

The embodiment of FIG. 1 is subject to many variations within the scope of the present invention. FIG. 4 shows a cross section for an alternative embodiment in which the top cover 12 has no depending projections 24. In the embodiment of FIG. 4, the insulating separator 20 is of an open-work type, being provided throughout its area with a multiplicity of openings 58 which extend therethrough. Depressing the top cover 12 of the graphics pad 10 of FIG. 4 causes the insulating separator 24 to compress so that the top cover 12 can touch the top of the base pad 22 through one or more of the openings 58. Just as in the embodiment of FIGS. 1–3, release of pressure on the top cover 12 allows the resiliency of the insulating separator 20 to return the top cover 12 to its normal position.

The insulating separators 20 of the embodiments of FIGS. 2 and 4 are particularly suited for use in graphics pads designed for applications where durability is an important factor, as for rough use in field areas. For graphics pads in which such durability is not necessary, the top cover 12 could be stretched and suspended by its edges over the base pad 22, or could be separated from the base pad 22 by an insulating liquid.

Figure 5:
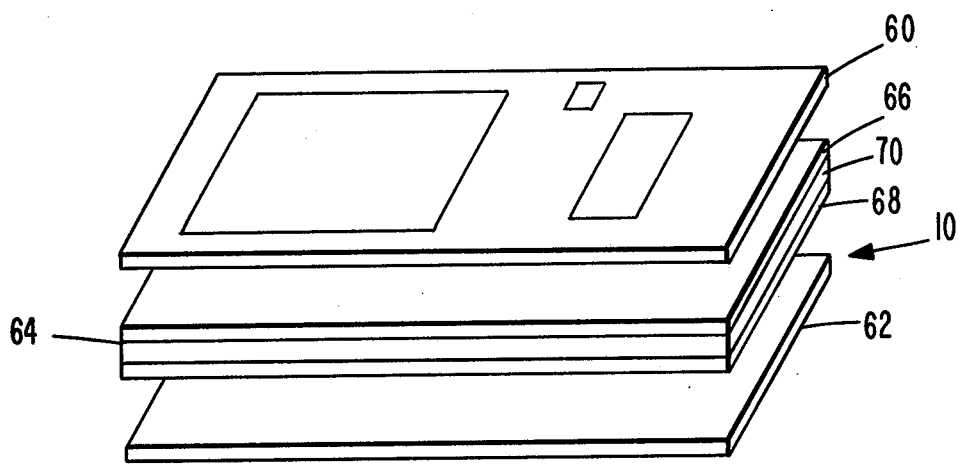
FIG. 5 is an exploded perspective view of another alternate embodiment of a graphical data entry pad constructed according to the present invention.
Figure 6:
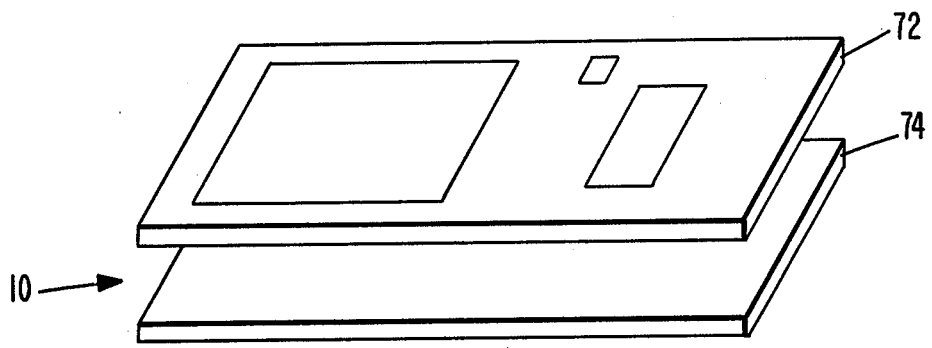
FIG. 6 is an exploded perspective view of yet another embodiment of a graphical data entry device according to the present invention.

FIGS. 5 and 6 show other alternate arrangements of the flexible membranes and conductive and resistive surfaces which may be particularly advantageous for particular unique situations and applications. In FIG. 5, the graphics pad 10 includes a flexible resistive top cover 60 and a resistive bottom pad 62 with a central sheet 64 therebetween. The central sheet 64 includes upper and lower conductive surfaces 66 and 68 separated by an insulating layer 70. The top cover 60 and the bottom pad 62 can be separated from the central sheet 64 by insulating separators or by any of the other methods discussed above. Both the top cover 60 and the base pad 62 are either wholly composed of resistive material or have resistive layers forming resistive grids applied to their respective lower and upper surfaces. The embodiment of FIG. 5 is so constructed so as to avoid the need for scanning electronics, as required by the embodiment of FIGS. 1–3, inasmuch as separate resistive grids are provided for each of the two orthogonal axes. The functioning of the graphics pad of FIG. 5 is otherwise completely identical to that of FIGS. 1–3 and should preferably include high resistive bands similar to those of FIG. 3 and possibly a switch function and potentiometer device, if such is desired.

In FIG. 6, a graphics pad 10 is shown that includes an upper flexible layer 72 and a lower rigid layer 74. The upper layer 72 and the lower layer 74 have resistive layers applied to their respective lower and upper surfaces, the two resistive layers being separately scanned in both the "x" and "y" directions. Touching of the graphics pad 10 of FIG. 6 results in a change in the resistive values obtained from each of the two resistive areas when scanned and the change can be converted by appropriate electronics into positional data.

Similarly in any of the embodiments of FIGS. 1–5 the position of the resistive surface and the conductive surface could be interchanged with no effect on the operation of the entry pad. Thus in FIG. 4, the resistive grid area 26 could be disposed on the bottom surface of the top cover 12 as long as suitable electrical connection could be made to it. In that case a conductive layer would cover the top surface of the base pad 22 and the entry pad would still function in the same manner.

Inasmuch as the present invention is subject to many variations, modifications and changes in detail, it is intended that all the material in the foregoing specification or in the accompanying drawings should be interpreted in an illustrative, and not in a limiting sense.

What is claimed is:

1. A graphical data entry device comprising
   a planar rectangular resistive grid area with four edges,
   a conductive layer supported spaced from but parallel to the resistive grid area,
   one of the resistive grid area and the conductive layer being selectively displaceable so as to contact the other of the resistive grid area and the conductive layer at any selected point in the resistive grid area,
   four connecting means spaced from the respective edges of the grid area for electrically connecting to external electronic circuitry, and
   planar resistive means connecting the respective connecting means to the respective edges of the resistive grid area, the planar resistive means having an effective resistance parallel to the edges of the resistive grid area substantially higher than that of the resistive grid area.

2. A graphical data entry device as claimed in claim 1 wherein the value of the resistance of the planar resistance means is ten times the value of the resistance of the resistive grid area.

3. A graphical data entry device as claimed in claim 1 wherein the planar resistive means is formed as four bands extending the length of and adjoining each of the respective edges of the resistive grid area.

4. A graphical data entry device as claimed in claim 3 wherein the four bands are formed of a resistance material having a higher resistivity per square than the resistive grid area.

5. A graphical data entry device as claimed in claim 1 wherein a base pad and a flexible top cover are provided spaced from and parallel to each other, the resistive grid area being formed on the upper surface of the base pad, the conductive layer being formed on the lower surface of the top cover.

6. A graphical entry device as claimed in claim 1 and including
   a flexible planar member having one of the resistive grid area and conductive layer disposed thereon,
   a rigid planar member having the other of the resistive grid area and the conducting layer disposed thereon, and
   said flexible planar member and said rigid planar member being spaced from and parallel to each other.

7. A graphical entry device as claimed in claim 6 including
   an insulating separator disposed between the flexible member and the rigid member, said separator being selectively penetrable by the flexible member so that electrical contact can be made between the resistive grid area and the conductive layer.

8. A graphical data entry device as claimed in claim 7 including depending projections of one of the resistive grid area and conductive layer extending from the flexible member so as to penetrate the insulating separator when the flexible planar member is displaced.

9. A graphical data entry device as claimed in claim 6 wherein the resistive grid area is formed by a resistive ink on the surface of the rigid member.

10. A graphical data entry device as claimed in claim 7 wherein the insulating separator has a plurality of openings formed therein through which the flexible member may be disposed to contact the rigid member.

11. A graphical data entry device as claimed in claim 6 wherein the layer of conductive material is the flexible member, which is composed entirely of conductive material.

12. A graphical data entry pad comprising
a flexible top cover having a resistive layer on its lower surface,
a rigid base pad having a resistive layer on its upper surface, and
a flexible central sheet having a conductive layer on both its upper and lower surfaces,
the top cover and the base pad being disposed spaced from but parallel to the central sheet on opposite sides thereof so that depression of the top cover causes the lower surface of the top cover to touch the upper surface of the cnetral sheet and causes the lower surface of the central sheet to touch the upper surface of the base pad.

13. A graphical data entry device comprising
a planar rectangular resistive grid area with four edges;
means for selectively electrically connecting to any point in the resistive grid area;
four side connecting means spaced from the respective edges of the grid area for electrically connecting to external electronic circuitry; and
planar resistive means connected between the respective side connecting means and the respective edges of the resistive grid area, the planar resistive means having an effective resistance parallel to the edges of the resistive grid area substantially higher than that of the resistive grid area.

14. A graphical data entry device as claimed in claim 13 wherein the side connecting means include a conductive layer supported in spaced relation from the resistive grid area.

15. A graphical data entry device as claimed in claim 13 wherein the rectangular resistive grid area is formed by a layer of resistive ink on a base pad.

16. A base pad for use in a graphical data entry device comprising
a planar base pad member of insulating material;
a planar rectangular resistive grid area formed on the planar base pad member, the resistive grid area having four edges,
planar resistive means formed along and connected with the respective edges of the resistive grid area, the planar resistive means having an effective resistance parallel to the edges of the resistive grid area substantially higher than that of the resistive grid area; and
four electrically connecting means joined to the planar resistive means and spaced from the resistive grid area for connecting the respective four edges of the resistive grid area to external circuitry;
the planar resistive grid area and the planar resistive means formed by a resistive material disposed on one surface of the planar base pad member.

17. A graphical data entry device as claimed in claim 16 wherein the planar resistive means includes four planar resistive means adjoining substantially the full lengths of the respective edges of the respective grid area.

18. A graphical data entry device comprising
a flexible planar member,
a rigid planar member disposed parallel to but spaced from the flexible member such that manual pressure can cause the flexible member to touch the rigid member,
a layer of conductive material on one of the flexible member and the rigid member, and
a layer of resistive material on the other of the flexible member and the rigid member, and
said layer of resistive material being disposed in a pattern so as to form both a grid area for the entry of graphical data and a potentiometer spaced from the grid area for the entry of analog data.

19. A graphical input pad as claimed in claim 18 further including a pair of closely spaced planar connector runs formed on the rigid member spaced from the grid area and potentiometer so as to form a switch device for the entry of digital data.

20. A graphical data entry device comprising
a flexible planar member,
a rigid planar member disposed parallel to but spaced from the flexible member such that manual pressure can cause the flexible member to touch the rigid member,
a layer of conductive material on one of the flexible member and the rigid member,
a layer of resistive material on the other of the flexible member and the rigid member,
said layer of resistive material being disposed in a pattern so as to form a grid area for the entry of graphical data, and
a pair of closely spaced planar connector runs formed on the other member spaced from the grid area so as to form a switch device for the entry of digital data.

* * * * *